United States Patent
Frenger et al.

(10) Patent No.: US 9,144,016 B2
(45) Date of Patent: Sep. 22, 2015

(54) RADIO BASE STATION, USER EQUIPMENT AND METHODS THEREIN

(75) Inventors: Pål Frenger, Linköping (SE); Niclas Wiberg, Linköping (SE); Erik Eriksson, Linköping (SE)

(73) Assignee: Telefonatiebolaget L M Ericsson (publ), Stockholm (SE)

( * ) Notice: Subject to any disclaimer, the term of this patent is extended or adjusted under 35 U.S.C. 154(b) by 118 days.

(21) Appl. No.: 14/125,449

(22) PCT Filed: Jun. 17, 2011

(86) PCT No.: PCT/SE2011/050776
§ 371 (c)(1),
(2), (4) Date: Dec. 11, 2013

(87) PCT Pub. No.: WO2012/173545
PCT Pub. Date: Dec. 20, 2012

(65) Prior Publication Data
US 2014/0106806 A1    Apr. 17, 2014

(51) Int. Cl.
*H04B 7/00* (2006.01)
*H04W 52/02* (2009.01)

(52) U.S. Cl.
CPC .................. *H04W 52/0216* (2013.01)

(58) Field of Classification Search
CPC ................... H04W 52/0216; H04W 52/0206; H04W 56/00; H04W 56/001; H04W 56/003; H04W 56/0045; H04W 74/00
USPC ........... 455/509, 522, 69, 444, 449, 450, 502, 455/135, 452.1, 452.2; 370/281, 289, 282, 370/310, 324, 507, 319, 208, 294, 295, 328, 370/330, 337, 345; 375/130, 132, 354, 355, 375/133, 295, 135
See application file for complete search history.

(56) References Cited

U.S. PATENT DOCUMENTS 6,278,699 B1 *  8/2001  Atarius ........................ 370/324
8,446,783 B2 *  5/2013  Klein ....................... 365/189.07

(Continued)

FOREIGN PATENT DOCUMENTS

JP    2010-056740 A    3/2010

OTHER PUBLICATIONS

International Preliminary Report on Patentability, PCT Application No. PCT/SE2011/050776, Dec. 17, 2013.

(Continued)

*Primary Examiner* — Tan Trinh
(74) *Attorney, Agent, or Firm* — Myers Bigel Sibley & Sajovec, P.A.

(57) ABSTRACT

Embodiments herein relate to a method in a radio base station for transmitting an information signal in a radio communications network. The radio base station is arranged to operate in a time structure associated with a clock and arranged to transmit an information signal associated with the time structure. The radio base station is in the radio communications network. The radio base station transmits the information signal repeatedly with a first frequency over a first period of time. Then, the radio base station transmits the same information signal repeatedly with a second frequency over a second period of time, wherein the first frequency is lower than the second frequency and the first period of time is longer than the second period of time.

26 Claims, 11 Drawing Sheets

(56) References Cited

U.S. PATENT DOCUMENTS

| | | | | |
|---|---|---|---|---|
| 8,454,864 B2* | 6/2013 | Huang | | 264/2.5 |
| 2004/0047318 A1* | 3/2004 | Matsumoto | | 370/335 |
| 2006/0074593 A1* | 4/2006 | Muraoka | | 702/182 |
| 2006/0083189 A1* | 4/2006 | Laroia et al. | | 370/319 |
| 2007/0066329 A1* | 3/2007 | Laroia et al. | | 455/502 |
| 2008/0079549 A1* | 4/2008 | Yamada et al. | | 340/10.5 |
| 2008/0080406 A1* | 4/2008 | Peplinski et al. | | 370/294 |
| 2010/0056160 A1* | 3/2010 | Kim et al. | | 455/444 |
| 2011/0142095 A1* | 6/2011 | Guo et al. | | 375/133 |
| 2011/0149817 A1* | 6/2011 | Song et al. | | 370/310 |
| 2013/0308505 A1* | 11/2013 | Hong et al. | | 370/310 |

OTHER PUBLICATIONS

International Search Report, PCT Application No. PCT/SE2011/050776, Mar. 1, 2012.

Written Opinion of the International Searching Authority, PCT Application No. PCT/SE2011/050776, Mar. 1, 2012.

Catt, "Synchronisation for triggering detached MTC devices", Agenda Item 9.4, SA WG2 Meeting #85 (SW-112339), Xi'An, P.R. China, May 16-20, 2011, 3 pp.

Interdigital Communications, "Triggering a detached MTC Device", Agenda Item 9.4, 3GPP TSG SA WG2 Meeting #83 (TD S2-110673), Salt Lake City, Utah, Feb. 21-25, 2011, 4 pp.

Interdigital Communications, "A method to trigger detached devices using broadcast channel", Agenda Item 9.4, 3GPP TSG SA WG2 Meeting #85 (TD S2-112562), Xian, China, May 16-20, 2011, 4 pp.

* cited by examiner

RADIO BASE STATION, USER EQUIPMENT AND METHODS THEREIN

CROSS REFERENCE TO RELATED APPLICATION

This application is a 35 U.S.C. §371 national stage application of PCT International Application No. PCT/SE2011/050776, filed on 17 Jun. 2011, the disclosure and content of which is incorporated by reference herein in its entirety. The above-referenced PCT International Application was published in the English language as International Publication No. WO 2012/173545 A1 on 20 Dec. 2012.

TECHNICAL FIELD

Embodiments herein relate to a radio base station, a user equipment and methods therein. In particular, embodiments herein relate to transmitting an information signal associated with a time structure in a radio communications network.

BACKGROUND

In today's radio communications networks a number of different technologies are used, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. A radio communications network comprises radio base stations providing radio coverage over at least one respective geographical area forming a cell. User equipments (UE) are served in the cells by the respective radio base station and are communicating with respective radio base station. The user equipments transmit data over an air or radio interface to the radio base stations in uplink (UL) transmissions and the radio base stations transmit data over an air or radio interface to the user equipments in downlink (DL) transmissions.

Today there are approximately 5 billion connectable devices in the radio communication networks. One vision for the future is that communication becomes so cheap so that network communication capabilities can be built into almost every small device or object. In the future the radio communications networks may need to serve up to 50 billion, or even 500 billion devices. The use cases that are currently being studied for a "500B vision" are: mass monitoring, e.g. of agricultural fields, energy infrastructure, and parking lots; mass controlling, e.g. of traffic lights, building automation, and lamps; object tracking, e.g. of baggage, parcels, and keys; personal health care, e.g. heart rate monitoring.

In a vision it is assumed that every small device can communicate. Most devices will be sending and/or receiving small amounts of data and for many devices the energy consumption will be the most important design limitation. For simple devices, such as small sensors, the battery might need to last for several years, since replacing the batteries more often than that will simply be prohibitively expensive. The devices need to be cheap and hence we assume that the typical device battery will have limited capacity, e.g. in the order of a standard AAA battery.

For many simple devices the energy consumption in the receiving circuits of the simple device will be dominating simply because the simple device does not transmit very often. The receiver (RX) radio front-end of the simple device is dominating in energy consumption and it is particularly expensive for the simple device to have the RX radio front-end activated. Typically the simple device in idle mode needs to activate the RX radio front-end when e.g. receiving data, listening for paging transmissions from the network, and/or performing radio measurements. During sleep mode the RX radio front-end, the RX base band, and the fine clock e.g. the local oscillator, can all be turned off and only a coarse clock that is used to wake up the simple device when the simple device need to be active. The coarse clock can be made extremely power efficient but the accuracy is typically rather poor.

The energy consumption in the radio communications network is dominated by the power amplifiers in the radio base stations. In order to reduce network energy consumption in future systems it is important to design for as much support of Discontinuous Transmission (DTX) as possible since the transmitters are then silent, which also leads to increased intervals of Discontinuous Reception (DRX). The mandatory overhead transmissions that do not relate to user plane data shall preferably transmitted only in short bursts every 10-100 ms or so, such as synchronization signal transmissions, a paging message, cell specific reference signals, master information block on a Physical Broadcast Channel (PBCH), or transmissions of higher layer system information blocks.

In order to reduce the energy consumption in the devices being in idle mode increased paging intervals is beneficial. For ultra-low power devices for Machine-to-Machine (M2M) communication the paging intervals can be measured in minutes or hours rather than seconds. Since the power required for the receiving device, also referred to as a user equipment, to have the RX radio front-end in active mode is so significant, it is important to keep the wake-up period required to receive a paging message as short as possible. Typically the RX radio front-end is active for 1-2 ms which is considered acceptable to read a paging message.

The problem is that long DRX cycles cause a significant timing uncertainty in the user equipment due to the fact that the coarse clock that is running in the idle mode is of low accuracy. Long DTX periods in the radio base stations and long DRX periods in the user equipments are wanted for the purpose of reducing energy consumption. It turns out that short wakeup periods in the user equipments are difficult to match with long DTX periods since the user equipments cannot quickly find the network timing, i.e. the synchronization clock of the network, when the network is not continuously transmitting the timing information.

In case the user equipment wakes up to read a paging message with an uncertain timing, then the period the user equipment receives transmissions needs to be long in order to capture the paging message transmitted from the network to activate the user equipment.

Today one may try and solve the problem by using shorter DRX cycles in the user equipments. This reduces the time the user equipment can be in sleep mode and hence it has the drawback of high energy consumption in the mobile terminal. Alternatively, the user equipment may keep the RX radio front-end active until it receives an overhead transmission carrying an information signal associated with the time structure in the radio base station, such as a synchronization signal transmission or the actual paging message, from the radio base station. This method increases the time the user equipment needs to have the RX radio front-end in active mode and hence it has the drawback of high energy consumption in the user equipment. Furthermore, the radio base station may transmit the information signal, such as synchronization signals, more often. This limits the applicability of network DTX in the radio base station and hence it has the drawback of high energy consumption in radio base station. Thus, the different solutions known in prior art require increased energy consumption in the radio communications network or in the user equipments.

SUMMARY

An object according to embodiments herein is to provide a mechanism for communicating in a radio communications network in an energy efficient manner.

According to an aspect the object is achieved in some embodiments by a method in a radio base station for transmitting information signal in a radio communications network. The radio base station is arranged to operate in a time structure associated with a clock and arranged to transmit an information signal associated with the time structure. The radio base station is comprised in the radio communications network. The radio base station transmits the information signal repeatedly with a first frequency over a first period of time. The radio base station furthermore transmits the same information signal repeatedly with a second frequency over a second period of time. The first frequency is lower than the second frequency and the first period of time is longer than the second period of time. The information signal is to be received by a user equipment enabling the user equipment to synchronize to the time structure in the radio base station.

According to another aspect the object is achieved in some embodiments by a method in a user equipment for enabling communication with a radio base station. The radio base station is arranged to operate in a time structure associated with a clock in the radio base station, and to transmit an information signal associated with the time structure. The user equipment retrieves timing information regarding timing of a transmission of the information signal associated with the time structure from the radio base station. The timing information indicates that the information signal is repeatedly transmitted with a first frequency over a first period of time and the information signal is transmitted repeatedly with a second frequency over a second period of time. The first frequency is lower than the second frequency and the first period of time is longer than the second period of time. The user equipment acquires the information signal associated with the time structure during the second period of time. The information signal enables the user equipment to synchronize to the time structure in the radio base station.

According to another aspect the object is achieved in some embodiments by providing a radio base station for transmitting an information signal in a radio communications network. The radio base station is arranged to operate in a time structure associated with a clock and arranged to transmit an information signal associated with the time structure. The radio base station comprises a transmitter configured to transmit the information signal repeatedly with a first frequency over a first period of time, and to transmit the same information signal repeatedly with a second frequency over a second period of time. The first frequency is lower than the second frequency and the first period of time is longer than the second period of time. The information signal is to be received by a user equipment enabling the user equipment to synchronize to the time structure in the radio base station.

According to another aspect the object is achieved in some embodiments by providing a user equipment for enabling communication with a radio base station. The radio base station is arranged to operate in a time structure associated with a clock in the radio base station, and to transmit an information signal associated with the time structure. The user equipment comprises a retrieving circuit configured to retrieve timing information regarding timing of a transmission of the information signal associated with the time structure. The timing information indicates that the information signal is repeatedly transmitted with a first frequency over a first period of time and the information signal is transmitted repeatedly with a second frequency over a second period of time. The first frequency is lower than the second frequency and the first period of time is longer than the second period of time. The user equipment comprises an acquiring circuit configured to acquire the information signal associated with the time structure during the second period of time. The information signal enables the user equipment to synchronize to the time structure in the radio base station.

An advantage with embodiments herein is that it enables low energy consumption in both the radio base station and in user equipments. Thus, embodiments herein enable user equipments to acquire accurate network timing with short receiver on-duration, i.e. short periods of time when the receiver is activated, and furthermore embodiments herein allow large amount of DTX from the radio base station during the first period with a low frequency of transmitted information signals.

BRIEF DESCRIPTION OF THE DRAWINGS

Embodiments will now be described in more detail in relation to the enclosed drawings, in which.

DETAILED DESCRIPTION

Figure 1:
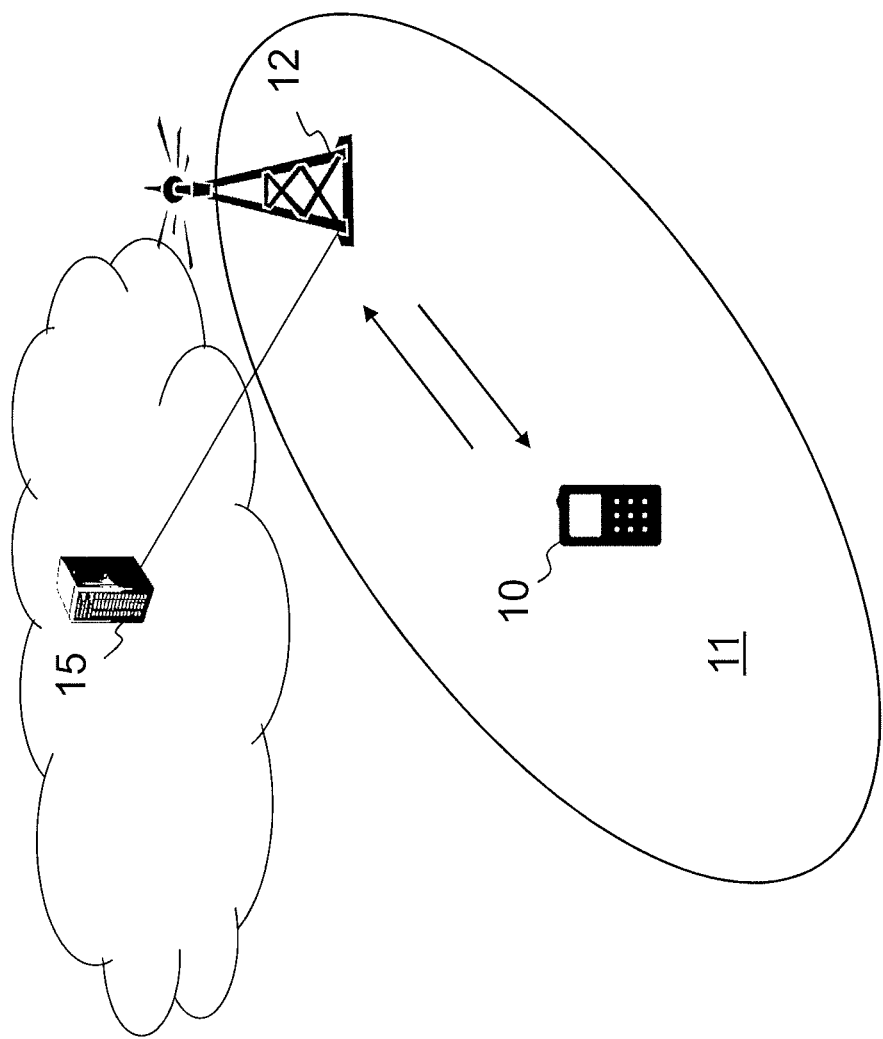
FIG. 1 is a schematic overview depicting a radio communications network.

FIG. 1 is a schematic overview depicting a radio communications networks using a technology, such as Long Term Evolution (LTE), LTE-Advanced, 3rd Generation Partnership Project (3GPP) Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The illustrated radio communications network comprises a user equipment 10, illustrated as a controlling sensor in a lamppost, communicating with a radio base station 12. The radio base station 12 provides radio coverage over at least one respective geographical area forming a cell 11. The cell definition may also incorporate frequency bands used for transmissions, which means that two different cells may cover the same geographical area but using different frequency bands. The user equipment 10 is served in the cell 11 by the radio base station 12. The user equipment 10 transmits data over an air or radio interface to the radio base stations 12 in uplink (UL) transmissions and the radio base station 12 transmits data over an air or radio interface to the user equipment in downlink (DL) transmissions. The radio base station 12 is further controlled by a controlling node 15 e.g. a core network node or an operation and maintenance node.

It should be understood by the skilled in the art that "user equipment" is a non-limiting term which means any wireless terminal, device or node e.g. Personal Digital Assistant (PDA), laptop, mobile phone, sensor, tag, relay, mobile tablets or even a small base station communicating within respective cell.

The radio base station 12 may also be referred to as e.g. a NodeB, an evolved Node B (eNB, eNode B), a base transceiver station, Access Point Base Station, base station router, relay node, or any other network unit capable to communicate with a user equipment within the cells served by the radio base station 12 depending e.g. of the radio access technology and terminology used.

The controlling node 15 may be a core network node such as a Mobility Management Entity or an operation and maintenance node in an operation support system (OSS).

In embodiments herein the radio base station 12 optimizes the energy consumption in the radio base station 12 as well as in the user equipment 10 by transmitting an information signal associated with a time structure of the radio base station 12 such as synchronization information in an efficient manner, which manner is known by the user equipment 10. The radio base station 12 transmits the information signal repeatedly with a first frequency over a first period of time P1. The radio base station 12 also transmits the same information signal, at least partly, repeatedly with a second frequency over a second period of time P2. The information signal is sent more frequently during the second period of time P2 which is shorter than the first period of time P1. As the user equipment 10 knows about the timing information, e.g. transmission scheme, of the information signal from the radio base station 12 the user equipment 10 determines the time the user equipment 10 should go active to retrieve the information signal. The information signal is thus to be received by the user equipment 10 enabling the user equipment 10 to synchronize to the time structure in the radio base station 12. The timing information may be received from the radio base station 12 or be preconfigured at the user equipment 10. The information signal may comprise a timing signal such as a synchronization signal, a paging message, a reference signal such as a cell specific reference signal, a master information block on a Physical Broadcast Channel (PBCH), or a transmission of higher layer system information blocks enabling the user equipment 10 to receive communications from the radio base station 12.

Hence, embodiments herein alternate between transmitting information signals such as network synchronization information or paging messages with high and low density in a transmission pattern that is known to the user equipment 10.

Figure 2:
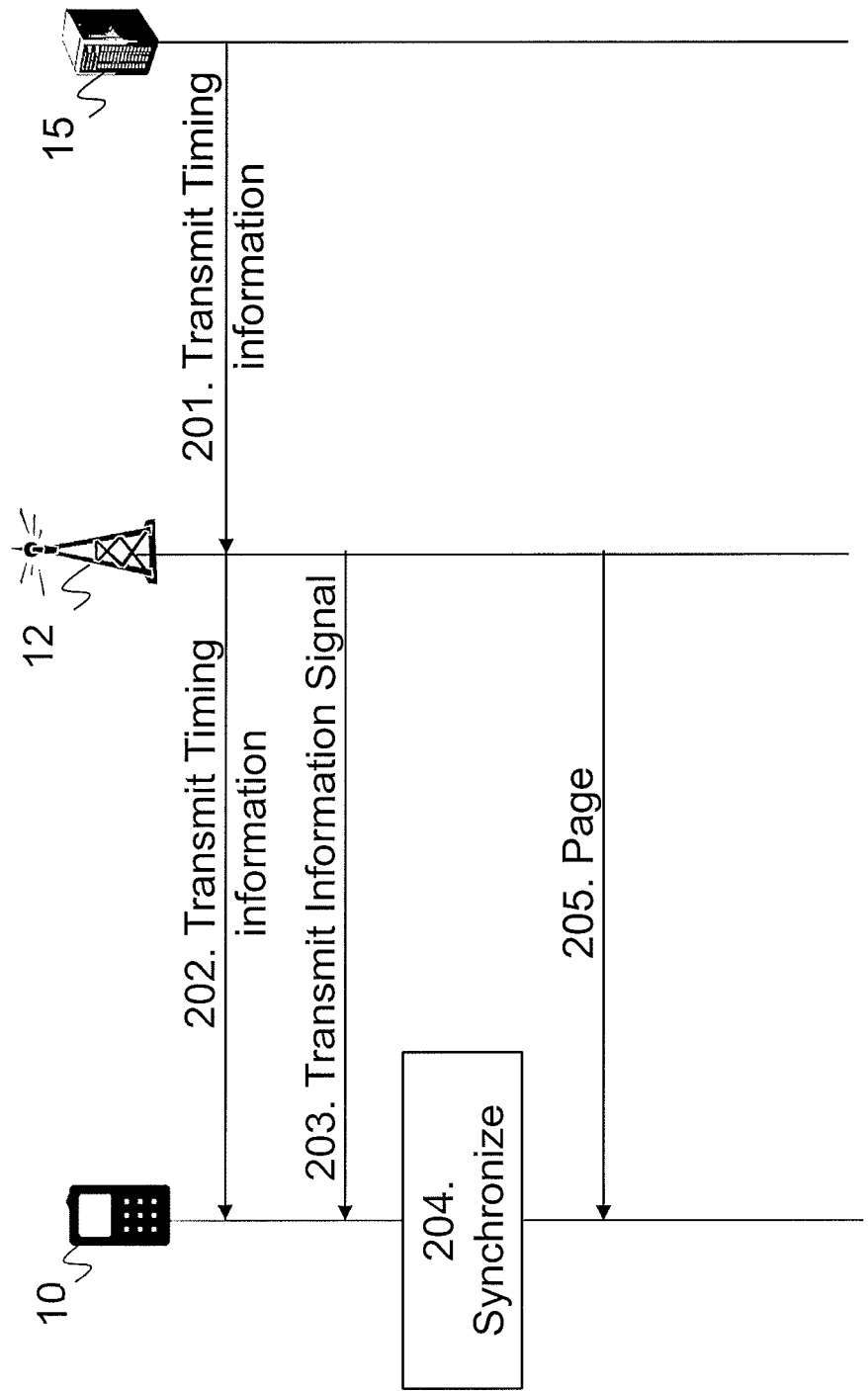
FIG. 2 is a combined flowchart and signalling scheme depicting embodiments in a radio communications network.

FIG. 2 is an example of a combined flowchart and signalling scheme in a radio communication network. The steps do not need to but may be performed in any suitable order.

Step 201.

In the illustrated example the controlling node 15 transmits a timing information to the radio base station 12. The timing information comprises information about the transmission of the information signal associated with the time structure of the radio base station 12. Such timing information may be a time length of the first period of time P1; the first frequency; a time length of the second period of time P2; the second frequency; a time location of the first period; and/or a time location of the second period. It should here be understood that the timing information may be manually configured or preconfigured in the radio base station 12.

Step 202.

The timing information is then, in the illustrated example, transmitted to the user equipment 10. It should here be understood that the timing information may be manually configured or preconfigured in the user equipment 10.

Step 203.

The radio base station 12 transmits the information signal associated with the time structure of the radio base station 12 to the user equipment 10. The information signal is transmitted repeatedly with the first frequency over the first period of time P1, and then transmitted repeatedly with the second frequency over the second period of time P2. As stated above, the first frequency is lower than the second frequency and the first period of time P1 is longer than the second period of time P2.

Step 204.

The user equipment 10 receives the information signal sent during the second period of time P2 when going to active mode from sleep mode as the user equipment 10 knows the timing information received from the radio base station 121. The user equipment 10 then synchronizes to the time structure in the radio base station 12.

Step 205.

The radio base station 12 may additionally page the user equipment 10 with information e.g. for notifying that the user equipment 10 will receive e.g. control information from the radio base station 12. As the user equipment 10 is synchronised to the radio base station 12 the page is received and the user equipment 10 goes into an active mode. That is, the user equipment 10 responds to the page and starts to receive and transmit data. Thus, the user equipment 10 may in some embodiments, in the paging process, activate the receiver circuits twice: Once in order to synchronize a coarse clock of the user equipment 10, e.g. 1 ms, and then again soon thereafter to receive the paging message, e.g. 1 ms.

Figure 3:
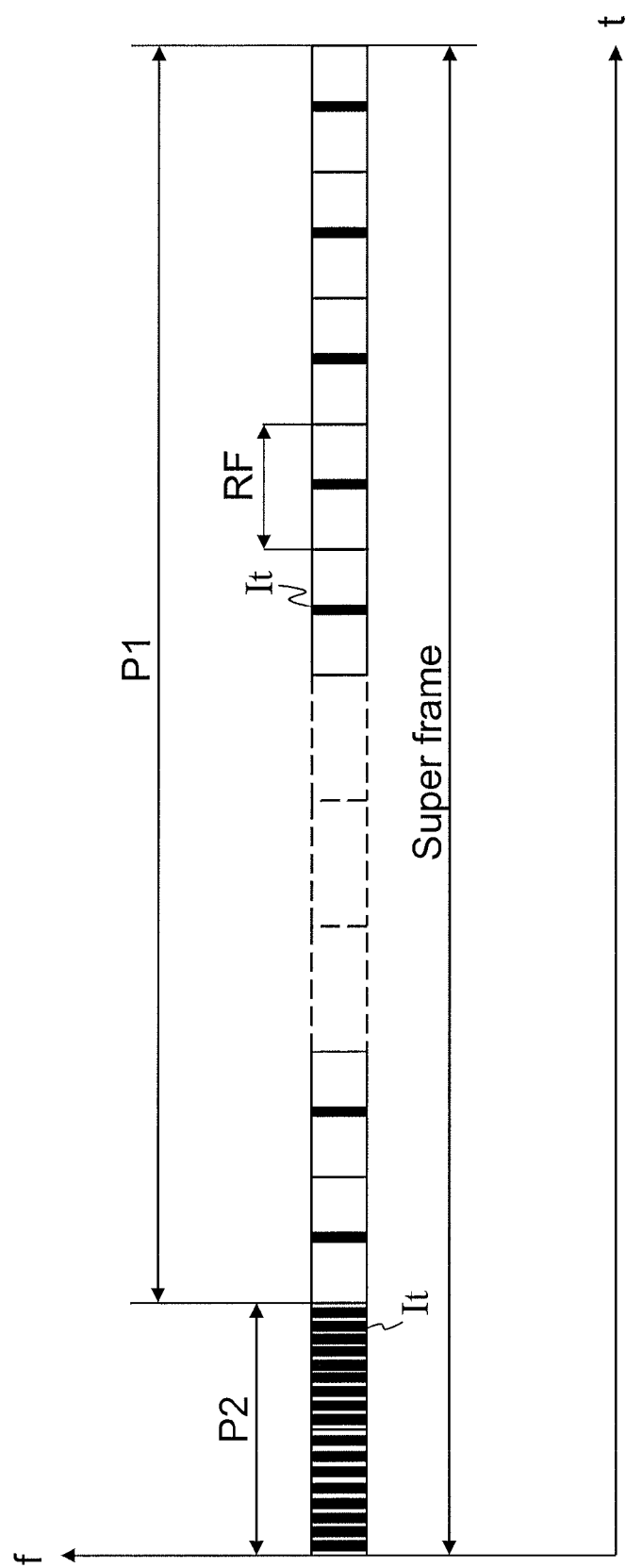
FIG. 3 is a schematic overview depicting a super frame in a radio communications network.

FIG. 3 is a schematic overview depicting a super radio frame comprising a number of Radio Frames (RF) e.g. 10-10, 000 radio frames along a radio frequency axis f and a time axis t. During the first period of time P1, also referred to as the "low sync density" period, with normal overhead transmission density the information signal 'It' associated with the time structure of the radio base station, also referred to as mandatory non user data related transmissions, are rare in order to allow for as much network DTX as possible, i.e. keep the transmission from the radio base station 12 as low as possible. During the second period of time P2, also referred to as the period with high overhead density or "high sync density" period, the information signal 'It' is common or continuous in order to allow for as short RX front-end on duration as possible for the user equipment 10 with inaccurate timing.

Figure 4:
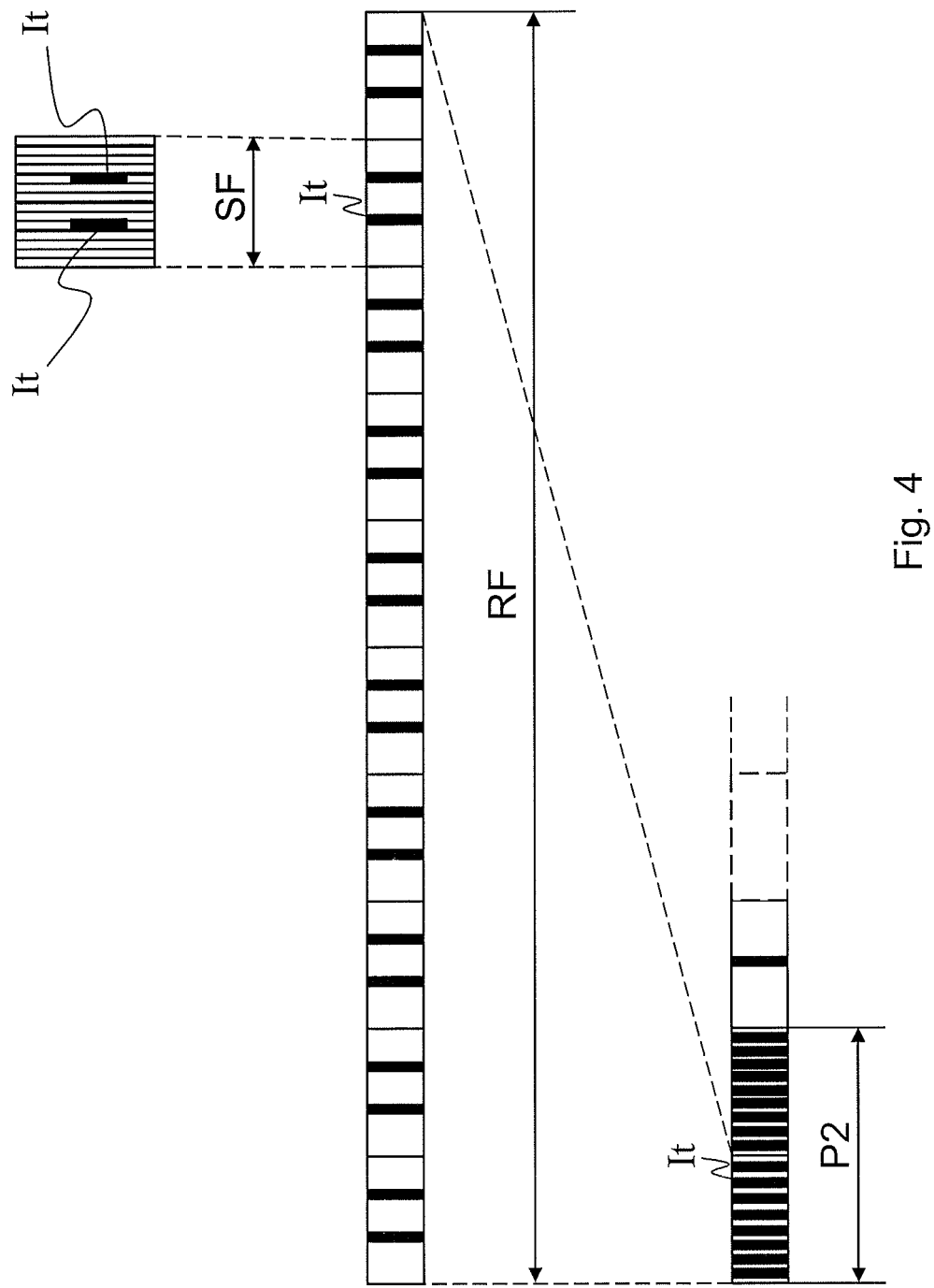
FIG. 4 is a schematic overview depicting a part of a super frame in a radio communications network.

FIG. 4 is a schematic enlarged overview depicting a Radio Frame (RF) of the second period of time P2 wherein the information signal 'It' is transmitted common or continuous. In the example, twenty Orthogonal Frequency-Division Multiplexing (OFDM) symbols per the RF of 10 ms comprise such information signal in the second period of time P2, i.e. two OFDM symbols comprises the information signal 'It' per subframe (SF). Such second periods P2 should be long enough so that the user equipment 10 may use its coarse low-power clock to wake up inside the second period of time P2. This length may be based on sensitivity of the coarse clock of the user equipment 10 as well as the length in time the user equipment 10 is in sleep mode. For example, if the user equipment 10 is in sleep mode in periods of fifteen minutes and the coarse clock loses 10 ms per hour, the second period of time P2 may be set to one second per fifteen minutes.

Figure 5:
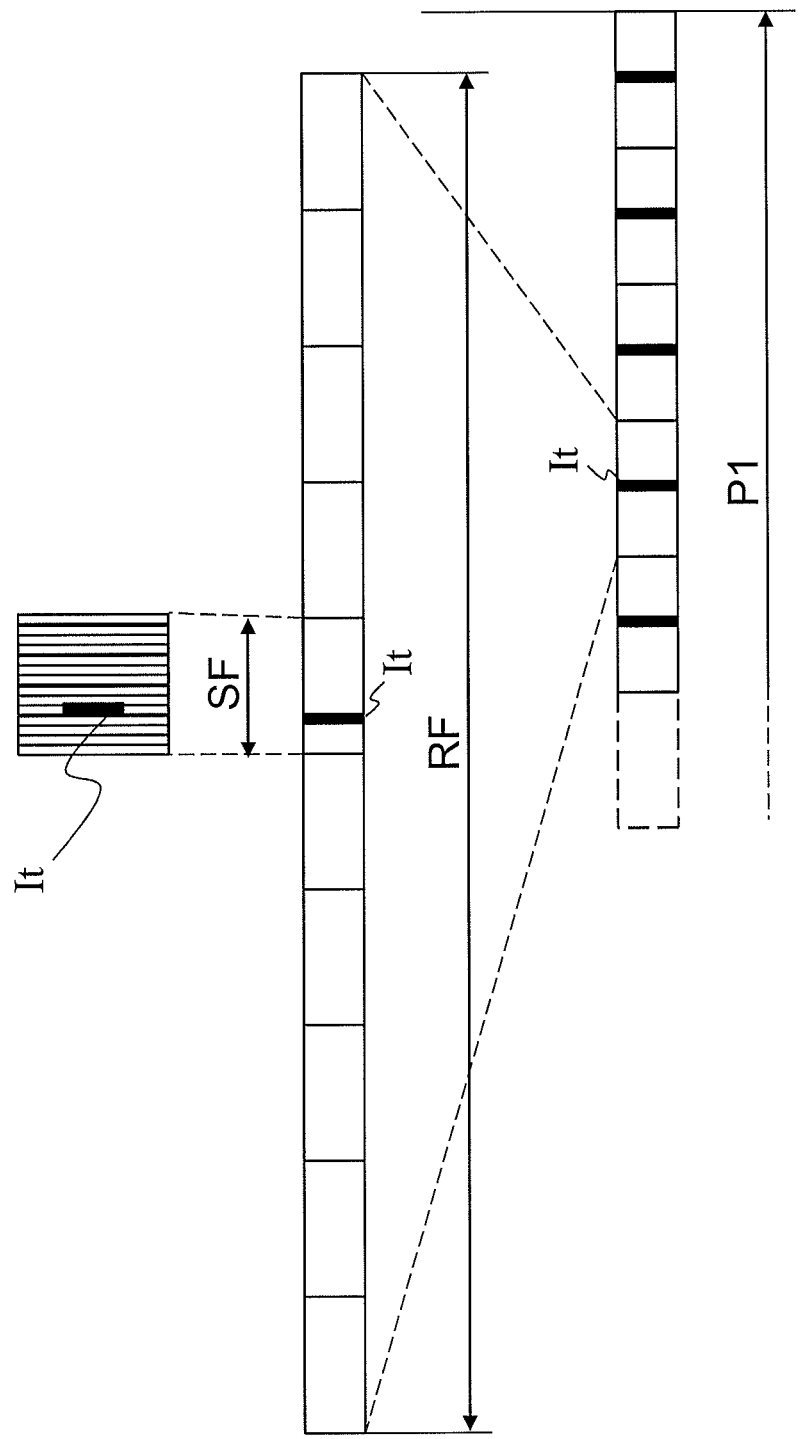
FIG. 5 is a schematic overview depicting a part of a super frame in a radio communications network.

FIG. 5 is a schematic enlarged overview depicting a Radio Frame (RF) of the first period of time P1 wherein the information signal 'It', e.g. synchronization signal, is transmitted rare. In the example, one OFDM symbol per RF of 10 ms comprises the information signal 'It' in the first period of time P1. This first period of time P1 may be for instance 100 ms or 1 s. During this period the communication of the user equipment 10 may be in sleep mode.

Figure 6:
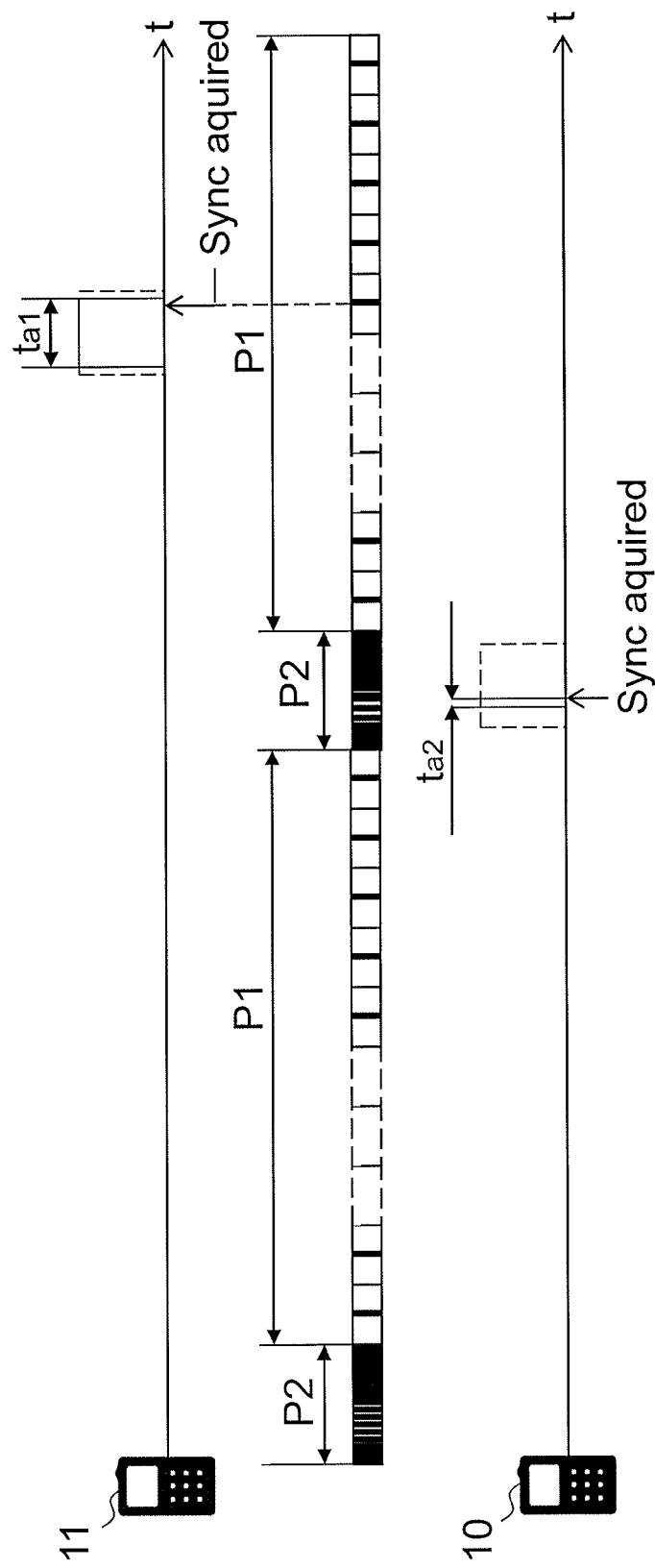
FIG. 6 is a schematic overview of embodiments herein for enabling communication with the radio base station.

An example showing the advantage of some embodiments herein is provided in FIG. 6. A top time-line t shows the receiver activity for a second user equipment 11, illustrated as a mobile phone, reading the synchronization signal in the first period of time P1. That is, the second user equipment 11 is not taking advantage of embodiments shown herein and the receiver of the second user equipment 11 goes active during the first period of time P1. Due to the timing uncertainty in the second user equipment 11 the receiver front-end of the second user equipment 11 need to be activated during a first time duration ta1 prior to the actual transmission of the synchronization signal.

In a bottom time line t the receiver activity of the user equipment 10 implementing disclosed embodiments herein is shown. The user equipment 10 wakes up in the high activity region, i.e. the second period of time P2, and hence the user equipment 10 receives and acquires the synchronization signal almost immediately during a second time duration ta2 and may after that turn off the receiver front-end of the user equipment 10 and save energy. The dashed lines illustrate the uncertainty window of the coarse clock of respective user equipment 10,11. As shown the uncertainty window is significant and if both user equipments 10,11 have the same uncertainty window, then the user equipment 10,11 that wakes up during the second period of time P2 is more likely to find synchronization quicker.

As the second time duration ta2 is much shorter than the first time duration ta1 the user equipment 10 reduces the energy consumption in comparison with the second user equipment 11.

Figure 7:
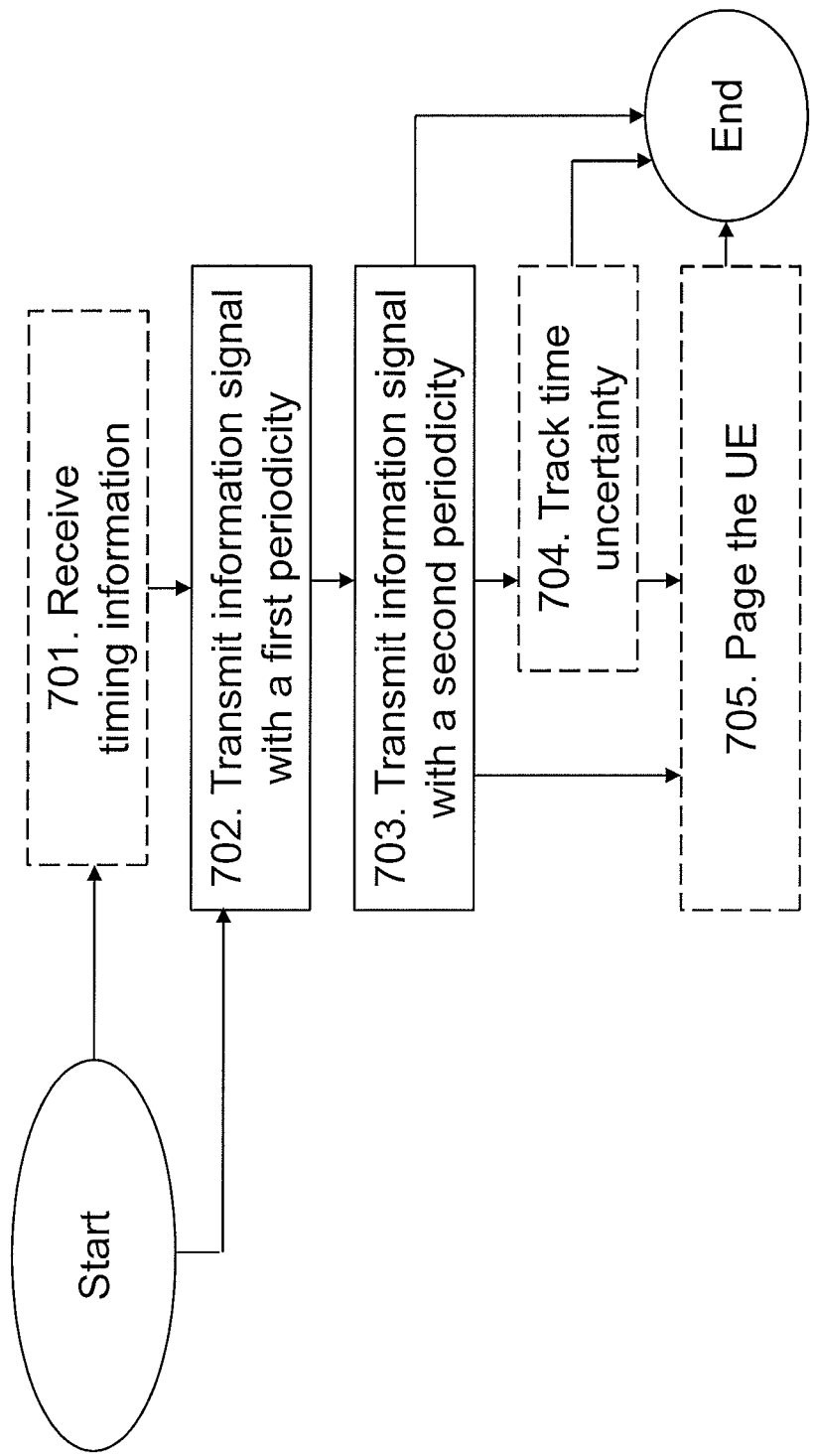
FIG. 7 is a schematic flowchart depicting a method in a radio base station according to embodiments herein.

The method steps in the radio base station, referred to as radio base station 12 in the figures, for transmitting an information signal in a radio communications network according to some embodiments will now be described with reference to a flowchart depicted in FIG. 7. The steps do not have to be taken in the order stated below, but may be taken in any suitable order. The radio base station 12 is comprised in the radio communications network, and is arranged to operate in a time structure associated with a clock. Thus, the radio base station 12 comprises an internal clock which is used to time communications and operations within the cell 11. The radio base station 12 is further arranged to transmit an information signal associated with the time structure. The information signal may comprise a timing signal such as a synchronization signal, a paging message, a reference signal such as a cell specific reference signal, a master information block on a Physical Broadcast Channel (PBCH), or a transmission of higher layer system information blocks enabling the user equipment 10 to receive communications from the radio base station 12. The steps that are performed in some embodiments are indicated with dashed boxes in FIG. 7.

Step 701.

The radio base station 12 may in some embodiments receive timing information from the controlling node 15. The timing information comprises an indication of: a time length of the first period of time P1; the first frequency; a time length of the second period of time P2; the second frequency; a time location of the first period; and/or a time location of the second period. Alternatively, the timing information may be manually configured or preconfigured in the radio base station 12. This timing information may additionally be transmitted to the user equipment 10.

Step 702.

The radio base station 12 transmits the information signal repeatedly with a first frequency over a first period of time P1. For example, the information may be transmitted in one OFDM symbol per a radio frame of 10 ms in the first period of time P1 also referred to as the "low sync density" period. This first period of time P1 may be much longer, for instance 100 ms or 1 s, than the second period of time P2.

Step 703.

The radio base station 12 transmits the same information signal repeatedly with a second frequency over a second period of time P2. The first frequency differs from the second frequency. The first frequency is lower than the second frequency and the first period of time P1 is longer than the second period of time P2. The information signal is to be received by the user equipment 10 and thus enabling the user equipment 10 to synchronize to the time structure in the radio base station 12. For example, the radio base station 12 may transmit twenty OFDM symbols per 10 ms radio frame in the second period of time P2, also referred to as "high sync density" period. Such high-density periods should be long enough so that the user equipment 10 may use its coarse low-power clock to wake up inside the second period of time P2. The length of the second period may be related to how long sleep mode periods the user equipment has, and/or how sensitive the coarse clock in the user equipment 10 is.

As the user equipment knows the timing information the user equipment 10 knows when to end sleep mode and activate receiving elements to acquire the information signal associated with the time structure.

Step 704.

The radio base station 12 may in some embodiments track a time value of a timing uncertainty in the user equipment 10. The timing uncertainty is relative the time structure of the radio base station 12.

For example, user equipments with large paging intervals will wake up to read paging messages with a large timing uncertainty. The radio base station 12 may keep track of the required duration for transmitting paging messages since that depends on the longest DRX duration of any user equipment waking up to read paging messages at that paging occasion. By aligning user equipments with long DRX to read paging messages at the same paging occasions most of the paging transmissions can be made short since most of the time only user equipments with short DRX durations will check for paging messages. In case no user equipment is to receive a paging message then a negative paging indication message can be transmitted from the radio base station 12 instead in order to allow user equipments to quickly determine that no paging is to be received and hence they may turn off their receiver circuits.

Step 705.

The radio base station 12 may in some embodiments page the user equipment 10 at a time in relation to the second period of time P2. For example, the radio base station 12 may page within a limited number of radio frames after the second period of time P2, during the second period of time P2, or continuously over both the first period of time P1 and the second period of time P2. A limited number of radio frames after the second period of time P2 may be set as the user equipment 10 takes some time to acquire the information signal; during the second period of time P2 if the second period of time P2 is a couple of radio frames and the user equipment 10 is more likely to acquire the information signal in the beginning of the second period of time P2. The radio base station 12 may plan the paging DRX cycle such each paging occasion occur shortly after a second period of time P2, so that the user equipment 10 may use the timing obtained from the second period of time P2 for paging detection, without having to waste too much power to keep the timing in the intermediate period.

The radio base station 12 may repeat the paging step 705 based on the tracked time value of the timing uncertainty in step 704.

Thus, the radio base station 12 may keep track of the timing uncertainty for the certain user equipment 10 and, when paging said user equipment 10, repeat paging information during a time longer than the timing uncertainty window of that user equipment 10. This procedure is beneficial in case the paging cost is low, e.g. if sufficient amount of paging resources are available and/or a Power Amplifier (PA) of the radio base station 12 is anyway active transmitting user data to some other user equipment. The radio base station 12 may stop the paging if the user equipment 10 performs a random access procedure.

Paging in e.g. an LTE network is the process of the notifying user equipment 10 in idle mode i.e. so-called RRC_IDLE mode, according to the Radio Resource Control (RRC) protocol, about an incoming data session. In the LTE network, the location of a user equipment 10 in idle mode is known by the network on a Tracking Area (TA) granularity. The Mobility Management Entity (MME) in a core network of the radio communications network initiates the paging procedure by sending a Paging message to all the radio base stations with at least a cell belonging to one or several TAs, in a so called Tracking Area List within which the user equipment 10 is registered. So for each incoming "call" towards an Idle user equipment, pagings will be sent out in ALL cells belonging to the TAs in the in the TA list. If the user equipment 10 reselects a cell belonging to a new TA where the user equipment 10 is not registered, the user equipment 10 initiates a TA update to the core network in order to register and it receives a new list of TAs where it is registered.

Figure 8:
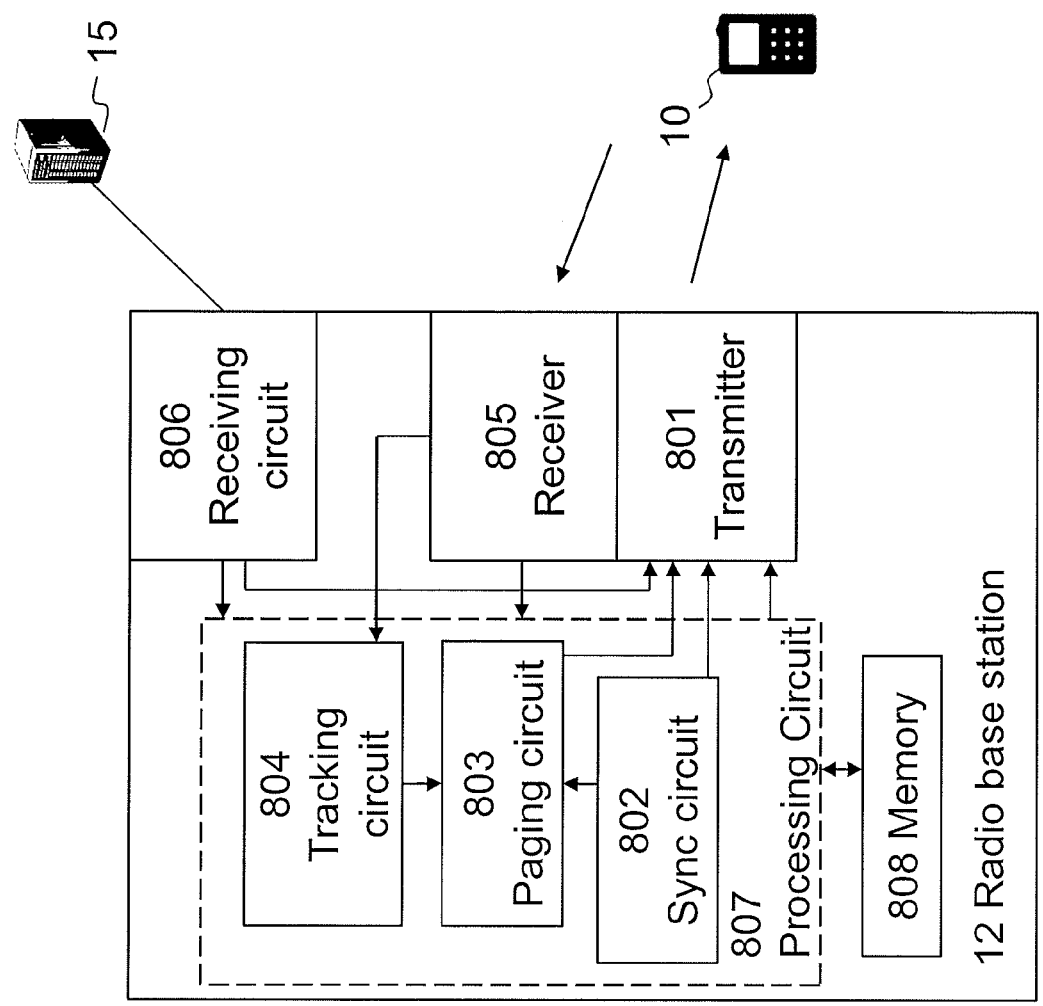
FIG. 8 is a block diagram depicting a radio base station according to embodiments herein.

In order to perform the method steps for transmitting an information signal in a radio communications network the radio base station 12 comprises an arrangement depicted in FIG. 8. The radio base station 12 is arranged to operate in a time structure associated with a clock and arranged to transmit an information signal associated with the time structure.

The radio base station 12 comprises a transmitter 801 configured to transmit the information signal repeatedly with a first frequency over a first period of time P1, and to transmit the same information signal repeatedly with a second frequency over a second period of time P2. The first frequency is lower than the second frequency and the first period of time P1 is longer than the second period of time P2. The information signal is to be received by a user equipment 10 enabling the user equipment 10 to synchronize to the time structure in the radio base station 12. The transmitter is connected to a synchronising (sync) circuit 802 comprising the clock to time or synchronise the transmissions according to the time structure from the radio base station 12. The transmissions may be controlled by a scheduler connected to the transmitter 801.

The radio base station may further comprise a paging circuit 803 configured to page the user equipment 10 at a time in relation to the second period of time P2. The paging circuit 802 may be configured to perform the paging within a limited number of radio frames after the second period of time P2, during the second period of time P2, or continuously over both the first period of time P1 and the second period of time P2.

The radio base station 12 may further comprise a tracking circuit 804 configured to track a time value of a timing uncertainty in the user equipment 10, which timing uncertainty is relative the time structure of the radio base station 12. The tracking circuit 803 may track the timing uncertainty based on paging occasions of the user equipment 10 indicating a DRX of the user equipment 10. Since the radio base station 12 may assume that the user equipment 10 will synchronize the coarse clock at least once every paging cycle, the timing uncertainty u for a user equipment 10 may e.g. be estimated to be approximately equal to a maximum clock drift factor G times the current paging interval τ of the same user equipment 10, i.e. $\upsilon = \sigma \times \tau$. The paging circuit 802 may be configured to repeat the page based on the tracked time value of the timing uncertainty e.g. repeat the paging during a time longer than the timing uncertainty.

The timing information may be received via a receiving circuit 806 from a controlling node 15. The timing information may alternatively be manually configured or preconfigured in the radio base station 12. The timing information may comprise an indication of at least one of the period of times, such as a time length of the first period of time P1; the first frequency; a time length of the second period of time P2; the second frequency; a time location of the first period of time P1; and/or a time location of the second period of time P2.

The embodiments herein for transmitting an information signal in a radio communications network the radio base station 12 may be implemented through one or more processors, such as a processing circuit 807 in the radio base station 12 depicted in FIG. 8, together with computer program code for performing the functions and/or method steps of the embodiments herein. The program code mentioned above may also be provided as a computer program product, for instance in the form of a data carrier carrying computer program code for performing embodiments herein when being loaded into the radio base station 12. One such carrier may be in the form of a CD ROM disc. It is however feasible with other data carriers such as a memory stick. The computer program code may furthermore be provided as pure program code on a server and downloaded to the radio base station 12.

The radio base station 12 may further comprise a memory 808, which may comprise one or more memory units and may be used to store for example data such as timing information, scheduling information, application to perform the methods herein when being executed on the radio base station 12 or similar.

Figure 9:
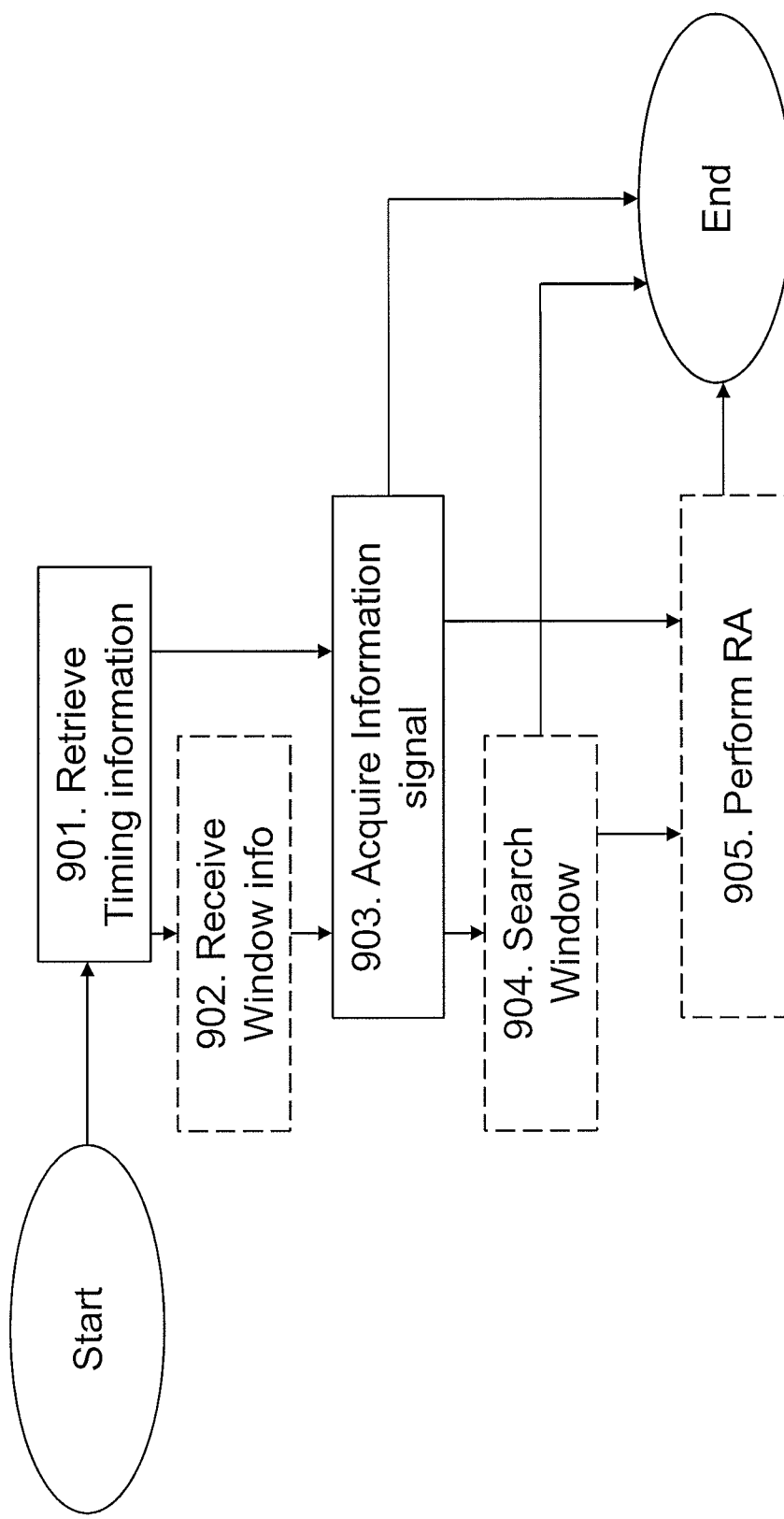
FIG. 9 is a schematic flowchart depicting a method in a user equipment according to embodiments herein.

The method steps in the user equipment 10 for enabling communication with the radio base station 12 according to some embodiments will now be described with reference to a flowchart depicted in FIG. 9. The steps do not have to be taken in the order stated below, but may be taken in any suitable order. The radio base station 12 is arranged to operate in a time structure associated with a clock in the radio base station 12 and to transmit an information signal associated with the time structure. The steps that are performed in some embodiments are indicated with dashed boxes in FIG. 9.

Step 901.

The user equipment 10 retrieves timing information regarding timing of the transmission of the information signal associated with the time structure. The timing information indicates that the information signal is repeatedly transmitted from the radio base station (12) with a first frequency over a first period of time (P1) and the information signal is transmitted repeatedly with a second frequency over a second period of time (P2), wherein the first frequency is lower than the second frequency and the first period of time (P1) is longer than the second period of time (P2). The timing information may be stored at the user equipment 10 and may comprise an indication of: a time length of the first period of time P1; the first frequency; a time length of the second period of time P2; the second frequency; a time location of the first period of time P1; and/or a time location of the second period of time P2. This timing information may be retrieved internally of the user equipment 10 when the timing information is pre-configured at the user equipment 10. Alternatively, the user equipment 10 may in some embodiments receive the timing information from the radio base station 12.

Thus, the user equipment 10 may receive the information signal on location of "high synch intensity" regions and paging DRX cycle. This information signal is communicated from the radio base station 12 to the user equipment 10 via broadcast or dedicated signalling.

Step 902.

The user equipment 10 may in some embodiments receive window information regarding a paging window and wherein the step of acquiring, see step 903, may be performed prior in time to the paging window.

Step 903.

The user equipment 10 acquires the information signal associated with the time structure e.g. by activating receiver hardware such as RX front end, during the second period of time P2. Thus, the user equipment 10 reads the information signal at a time when the information signal is transmitted at a high density of information signals. For example, the user equipment 10 activates the receiver hardware during the second period of time P2 as the second period of time P2 is a period where e.g. sync information is transmitted with a high frequency, a so called high density period. The received information signal enables the user equipment 10 to synchronize to the time structure in the radio base station 12. In some embodiments, the user equipment 10 also checks for paging information during the second period of time P2. The user equipment 10 may activate a receiver at the user equipment 10 to acquire and receive the information signal associated with the time structure.

Step 904.

The user equipment 10 may in some embodiments search for paging information within the paging window indicated in the window information. The user equipment 10 may thus turn on the radio receiver and search for paging information during the paging window. When paging duration approaches, the user equipment 10 may acquire accurate timing of internal clock by activating receiver hardware and reading synch information in high density period of time Prior to the paging window. The user equipment 10 may further check for paging information received during the receiver on-duration. Either, a complete paging message may be received in this on-duration window and in that case the paging procedure is finished. Or, a paging indication on/off flag to a group of user equipments, e.g. a bit in bitmap, is received that informs the user equipment 10 whether the user equipment 10 needs to turn on the receiver again and read the paging information.

Step 905.

The user equipment 10 may in some embodiments perform Random Access Channel (RACH) transmission using the acquired information signal. When the user equipment 10 needs to do random access transmission, first acquire accurate timing by reading synch information in high density period. This enables the user equipment 10 to perform the RACH transmission using correct uplink time synchronization without first having to spend a lot of time and energy to acquire network synchronization.

Figure 10:
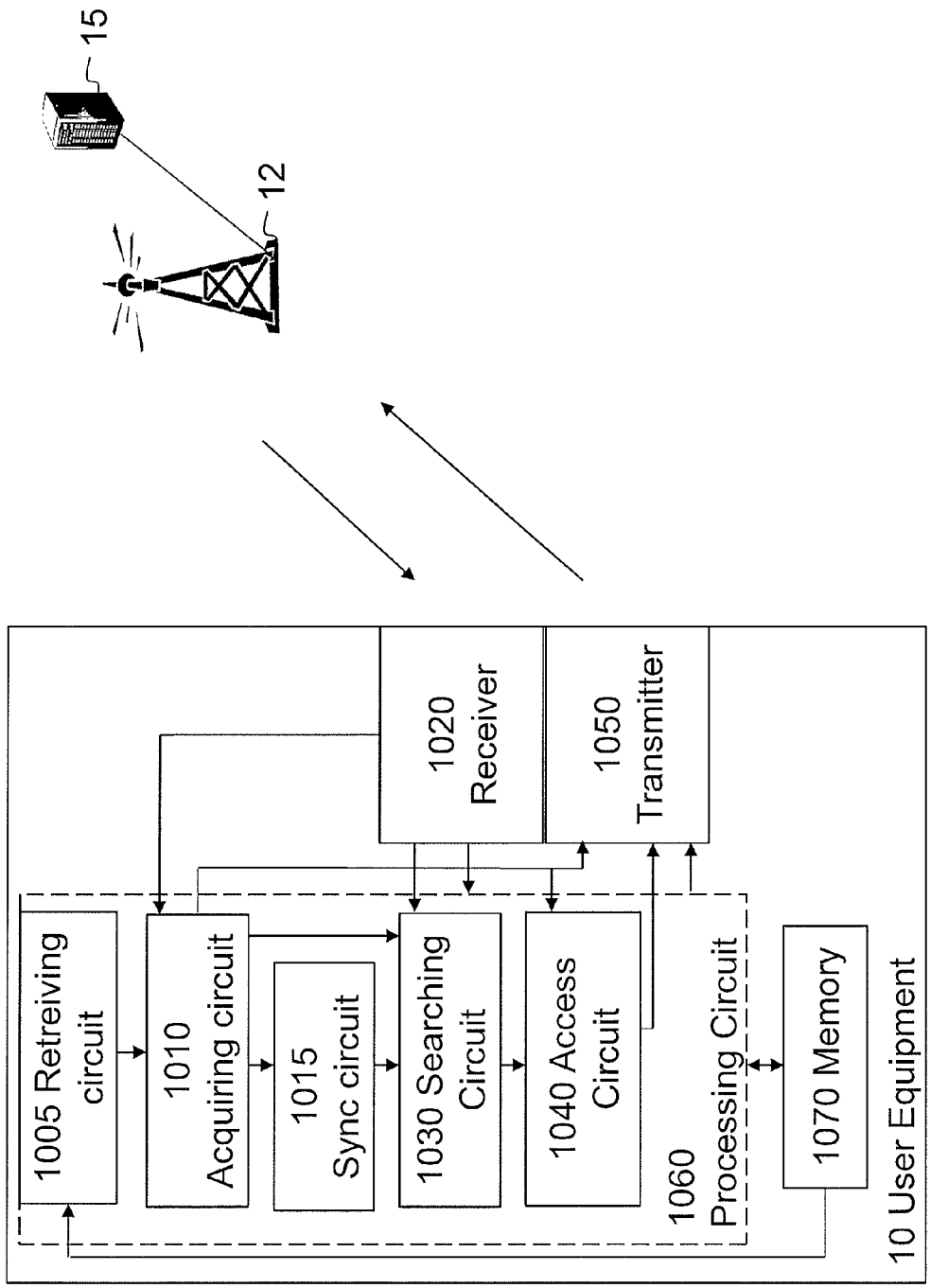
FIG. 10 is a block diagram depicting a user equipment according to embodiments herein.

In order to perform the method steps for enabling communication with the radio base station 12, the user equipment 10 comprises an arrangement depicted in FIG. 10. The radio base station 12 is arranged to operate in a time structure associated with a clock in the radio base station 12, and to transmit an information signal associated with the time structure. The user equipment 10 comprises a retrieving circuit 1005 configured to retrieve timing information regarding timing of a transmission of the information signal associated with the time structure, wherein the timing indicates that the information signal is repeatedly transmitted with a first frequency over a first period of time P1 and the information signal is transmitted repeatedly with a second frequency over a second period of time P2. The first frequency is lower than the second frequency and the first period of time P1 is longer than the second period of time P2. The timing information may be received from the radio base station 12 or may be pre-configured at the user equipment 10. The retrieved timing information may comprise an indication of: a time length of the first period of time P1; the first frequency; a time length of the second period of time P2; the second frequency; a time location of the first period; and/or a time location of the second period.

The user equipment 10 comprises an acquiring circuit 1010 configured to acquire the information signal associated with the time structure during the second period of time P2. The information signal enables the user equipment 10 to synchronize to the time structure in the radio base station 12. In some embodiments paging information is checked for during the second period of time P2. The user equipment may further comprise a synchronising circuit 1015 comprising a clock e.g. a coarse clock, configured to synchronise the user equipment 10 to the radio base station 12 using the acquired information signal.

The user equipment 10 may further comprise a receiver 1020 connected to the acquiring circuit 1010 and configured to receive a window information regarding a paging window and wherein the acquiring circuit 1010 is further configured to perform the acquiring prior in time to the paging window. The acquiring circuit 1010 may in some embodiments further be configured to activate the receiver 1020 at the user equipment 10 to receive the information signal associated with the time structure.

The user equipment may further comprise a searching circuit 1030 configured to search for paging information within the paging window.

The user equipment may further comprise an access circuit 1040 configured to perform a Random Access Channel transmission using the acquired information signal via a transmitter 1050.

The embodiments herein for enabling communication with the radio base station 12 may be implemented through one or more processors, such as a processing circuit 1060 in the user equipment 10 depicted in FIG. 10, together with computer program code for performing the functions and/or method steps of the embodiments herein. The program code mentioned above may also be provided as a computer program product, for instance in the form of a data carrier carrying computer program code for performing embodiments herein when being loaded into the user equipment 10. One such carrier may be in the form of a CD ROM disc. It is however feasible with other data carriers such as a memory stick. The computer program code may furthermore be provided as pure program code on a server and downloaded to the user equipment 10.

The user equipment may further comprises a memory 1070, which may comprise one or more memory units and may be used to store for example data such as the timing information, scheduling information, counters, application to perform the methods herein when being executed on the radio base station 12 or similar. The user equipment 10 may receive a DL radio signal through an antenna and may typically down-convert the received radio signal to an analogue baseband signal in a front end receiver. The baseband signal may be spectrally shaped by an analogue filter that has a bandwidth BW0, and the shaped baseband signal generated by the filter may be converted from analogue to digital form by an analogue-to-digital converter (ADC). The digitized baseband signal may further be spectrally shaped by a digital filter that has a bandwidth, which corresponds to the bandwidth of synchronization signals or symbols included in the DL signal. The shaped signal generated by the filter may be provided to a cell search unit that carries out one or more methods of searching for cells as specified for the particular communication system, e.g., 3G LTE. Typically, such methods involve detecting predetermined primary and/or secondary synchronization channel (P/S-SCH) signals in the received signal.

Figure 11:
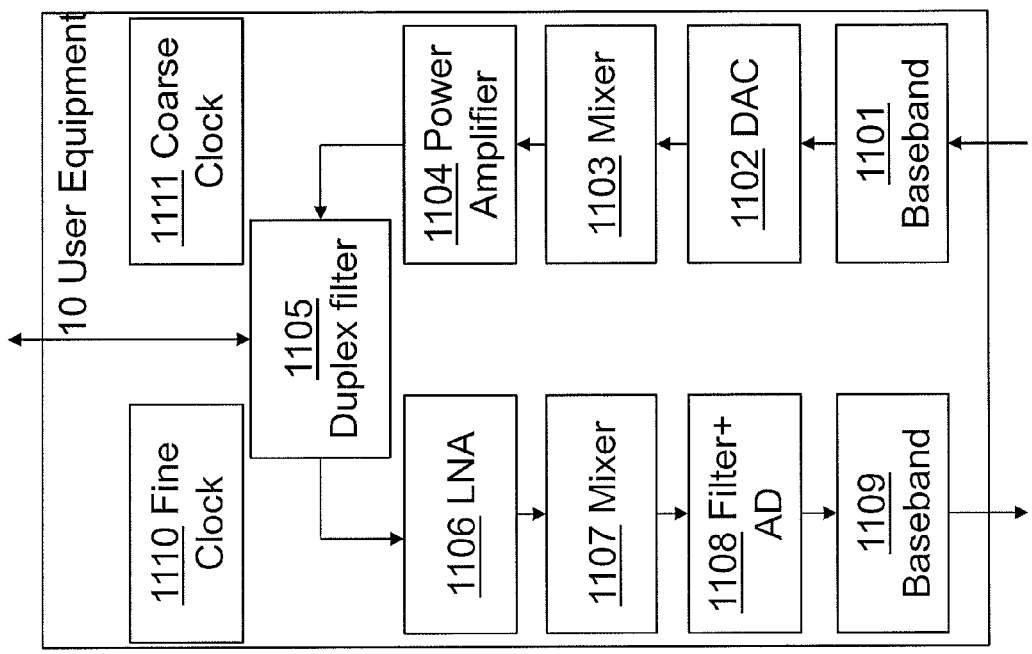
FIG. 11 is a block diagram depicting a user equipment according to some embodiments herein.

A functional model of the communication parts in some embodiments of the user equipment 10 for a typical Machine-to-Machine (M2M) communication device is shown in FIG. 11. The communication parts receive and process a received signal to analyse e.g. an information signal. The illustrated example comprises a baseband filter 1101, a digital to analogue converter (DAC) 1102, a mixer 1103, a Power Amplifier 1104, a Duplex filter 1105, a Low Noise Amplifier (LNA) 1106, a mixer 1107, a filter and analogue to digital (AD) converter 1108, a baseband 1109, each consuming energy to receive the signal. The user equipment 10 may further comprise a fine clock 1110 e.g. a local oscillator. Furthermore, the user equipment 10 comprises a coarse clock 1111 to keep time internally in sleep mode. The coarse clock 1111 may lose the time synchronisation during sleep mode, but the user equipment 10 knows the transmission scheme of the information signal stored as timing information at the user equipment 10 and the user equipment 10 then knows when to acquire the information signal to synchronize the coarse clock 1111 to the clock at the radio base station 12. According to embodiments herein, the DRX is thus optimized at the user equipment 10 and the communication parts are consuming energy in an optimized manner.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the invention being defined by the following claims.

The invention claimed is:

1. A method in a radio base station for transmitting an information signal in a radio communications network, which radio base station is arranged to operate in a time structure associated with a clock and arranged to transmit an information signal associated with the time structure, and which radio base station is comprised in the radio communications network, the method comprises:
   transmitting the information signal repeatedly with a first frequency over a first period of time, and
   transmitting the same information signal repeatedly with a second frequency over a second period of time, wherein the first frequency is lower than the second frequency and the first period of time is longer than the second period of time, which information signal is to be received by a user equipment enabling the user equipment to synchronize to the time structure in the radio base station.

2. The method according to claim 1, further comprising:
   paging the user equipment at a time defined relative to the second period of time.

3. The method according to claim 2, wherein the paging is performed within a limited number of radio frames after the second period of time or during the second period of time.

4. The method according to claim 1, further comprising:
   tracking a time value of a timing uncertainty in the user equipment, which timing uncertainty is relative the time structure of the radio base station.

5. The method according to claim 4, wherein the paging is repeated based on the tracked time value of the timing uncertainty.

6. The method according to claim 1, wherein a timing information is received from a controlling node, manually configured or preconfigured in the radio base station, and which timing information comprises an indication of: a time length of the first period of time; the first frequency; a time length of the second period of time; the second frequency; a time location of the first period of time; and/or a time location of the second period of time.

7. A method in a user equipment) for enabling communication with a radio base station, which radio base station is arranged to operate in a time structure associated with a clock in the radio base station, and to transmit an information signal associated with the time structure; the method comprising:
   retrieving timing information regarding timing of a transmission of the information signal associated with the time structure, which timing information indicates that the information signal is repeatedly transmitted from the radio base station with a first frequency over a first period of time and the information signal is transmitted repeatedly with a second frequency over a second period of time, wherein the first frequency is lower than the second frequency and the first period of time is longer than the second period of time, and
   acquiring the information signal associated with the time structure during the second period of time, which information signal enables the user equipment to synchronize to the time structure in the radio base station.

8. The method according to claim 7, wherein the timing information is received from the radio base station or is preconfigured at the user equipment.

9. The method according to claim 7, wherein the retrieved timing information comprises an indication of: a time length of the first period of time; the first frequency; a time length of the second period of time the second frequency; a time location of the first period of time; and/or a time location of the second period of time.

10. The method according to claim 7, wherein also paging information is checked for during the second period of time.

11. The method according to claim 7, further comprising:
   receiving window information regarding a paging window and wherein the acquiring is performed prior in time to the paging window, and
   searching for paging information within the paging window.

12. The method according to claim 7, further comprising: performing Random Access Channel transmission using the acquired information signal.

13. The method according to claim 7, wherein the acquiring comprises activating a receiver at the user equipment to receive the information signal associated with the time structure.

14. A radio base station for transmitting an information signal in a radio communications network, which radio base station is arranged to operate in a time structure associated with a clock and arranged to transmit an information signal associated with the time structure, the radio base station comprises:
  a transmitter configured to transmit the information signal repeatedly with a first frequency over a first period of time, and to transmit the same information signal repeatedly with a second frequency over a second period of time, wherein the first frequency is lower than the second frequency and the first period of time is longer than the second period of time, which information signal is to be received by a user equipment enabling the user equipment to synchronize to the time structure in the radio base station.

15. The radio base station according to claim 14, further comprising a paging circuit configured to page the user equipment at a time defined relative to the second period of time.

16. The radio base station according to claim 15, wherein the paging circuit is configured to perform the paging within a limited number of radio frames after the second period of time, or during the second period of time.

17. The radio base station according to claim 14, further comprising:
  a tracking circuit configured to track a time value of a timing uncertainty in the user equipment, which timing uncertainty is relative the time structure of the radio base station.

18. The radio base station according to claim 17, wherein the paging circuit is further configured to repeat the page based on the tracked time value of the timing uncertainty.

19. The radio base station according to claim 14, wherein a timing information is received from a controlling node, manually configured or preconfigured in the radio base station, and which timing information comprises an indication of: a time length of the first period of time; the first frequency; a time length of the second period of time; the second frequency; a time location of the first period of time; and/or a time location of the second period of time.

20. A user equipment for enabling communication with a radio base station, which radio base station is arranged to operate in a time structure associated with a clock in the radio base station, and to transmit an information signal associated with the time structure, the user equipment comprising:
  a retrieving circuit configured to retrieve timing information regarding timing of a transmission of the information signal associated with the time structure, wherein the timing indicates that the information signal is repeatedly transmitted with a first frequency over a first period of time and the information signal is transmitted repeatedly with a second frequency over a second period of time, wherein the first frequency is lower than the second frequency and the first period of time is longer than the second period of time; and
  an acquiring circuit configured to acquire the information signal associated with the time structure during the second period of time, which information signal enables the user equipment to synchronize to the time structure in the radio base station.

21. The user equipment according to claim 20, wherein the timing information is received from the radio base station or is pre-configured at the user equipment.

22. The user equipment according to claim 20, wherein the retrieved timing information comprises an indication of: a time length of the first period of time; the first frequency; a time length of the second period of time; the second frequency; a time location of the first period of time; and/or a time location of the second period of time.

23. The user equipment according to claim 20, wherein also paging information is checked for during the second period of time.

24. The user equipment according to claim 20, further comprising
  a receiver configured to receive a window information regarding a paging window and wherein the acquiring circuit is further configured to perform the acquiring prior in time to the paging window, and
  a searching circuit configured to search for paging information within the paging window.

25. The user equipment according to claim 20, further comprising:
  an access circuit configured to perform a Random Access Channel transmission using the acquired information signal.

26. The user equipment according to claim 20, wherein the acquiring circuit is further configured to activate a receiver at the user equipment to receive the information signal associated with the time structure.

* * * * *